(No Model.)
W. LITTLEJOHN.
WINDROWING SUGAR CANE AND PREPARING IT FOR THE GRINDING MILL.
No. 250,741. Patented Dec. 13, 1881.
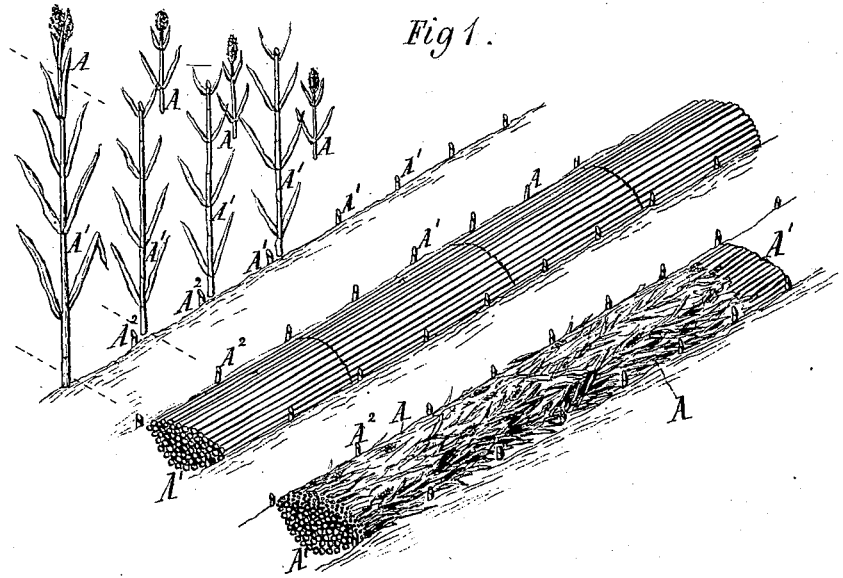
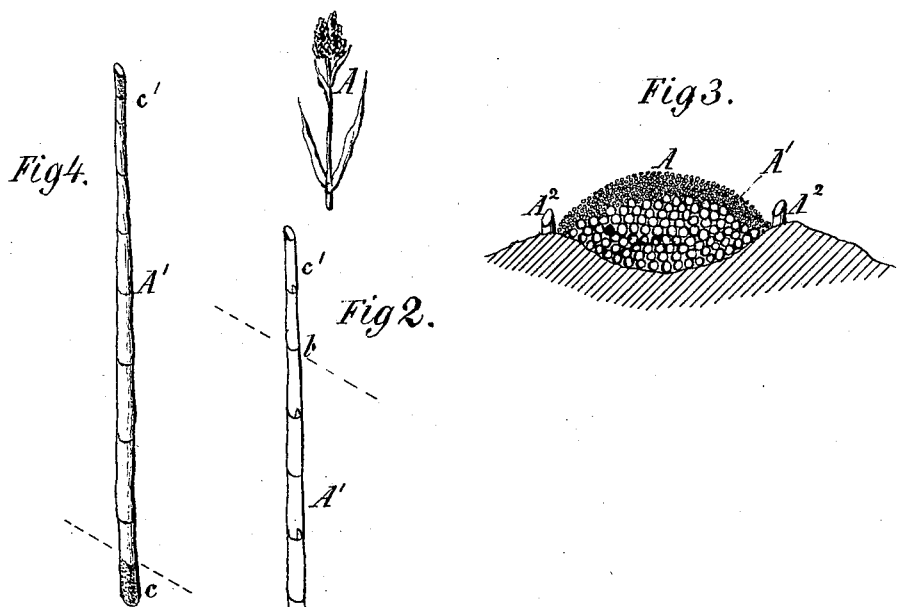
Witnesses:
J. P. Theo Lang.
B. Carlyle Fenwick
Inventor:
William Littlejohn
by his atty
Mason Fenwick & Lawrence

UNITED STATES PATENT OFFICE.

WILLIAM LITTLEJOHN, OF NEW ORLEANS, LOUISIANA.

WINDROWING SUGAR-CANE AND PREPARING IT FOR THE GRINDING-MILL.

SPECIFICATION forming part of Letters Patent No. 250,741, dated December 13, 1881.

Application filed November 8, 1881. (No model.)

*To all whom it may concern:*

Be it known that I, WILLIAM LITTLEJOHN, a citizen of the United States, residing at New Orleans, parish of Orleans, and State of Louisiana, have invented a new and Improved Mode of Windrowing Sugar-Cane and Preparing it for Grinding, of which the following is a specification.

My invention consists in cutting off the tops of the growing stalks, then cutting off the cane-stalks proper near their roots, then laying the stalks in windrows in the furrows, and thickly covering them with the tops which were first cut off.

In the accompanying drawings, Figure 1 is a perspective view of a portion of a sugar-cane field, illustrating the manner of use of my invention. Fig. 2 is a side view of a single cane-stalk severed from the root, and having its top cut off. Fig. 3 is a transverse section of a portion of a cane-field, showing the stubs of two rows of cane-stalks which have been cut down, and also showing, in end elevation, a quantity of the cut stalks windrowed according to my invention. Fig. 4 is a side elevation of a single cane-stalk proper as it appears when taken from the windrow shown in Fig. 3. This view illustrates, by black dots, the reddened ends of the stalks.

The ordinary mode of gathering cane for the grinding-mill is to cut and grind it as fast as possible, and this course is pursued until the frost appears and kills the buds of the cane-stalks standing, when it is customary for the planter to cut off the cane-stalks near their roots, and to place them in windrows in the furrows of the field, with the tops of one portion of the stalks lapping over and covering the bodies of another portion, similar to the mode of laying shingles upon a roof.

Instead of pursuing the old mode, I first cut off the tops A of the stalks at points, say, about two joints above the ripe joint $b$. Next I cut off the stalks A' near the ground, leaving only stubs A². In the operation of cutting the cane-stalks I prefer to have four men cut four rows simultaneously, the cut cane-stalks proper of the four rows being thrown together in one furrow, while the cut tops thereof are thrown into the two furrows alongside the furrow in which the cane is placed. The cane-stalks proper being thus closely compacted in the furrow, the "trash gang," or hands who follow the cane-cutters, gather up the tops and place them upon the stalks proper to a depth, say, of one foot, more or less. The stalks, when windrowed according to my invention, are not liable to be acted upon by the frost, as the eyes thereof are not exposed, and the result is the eyes cannot become blackened so as to color the juice while the cane is being ground.

It is well known among sugar-planters that a considerable risk is run by windrowing cane before the bud is killed by a frost, (after that it becomes necessary to windrow it, as otherwise a second frost might split the cane, or the eyes, if not killed, might sprout, and thus cause loss,) because, if the weather should be warm and rainy and the bud should not have been previously killed, vegetation would be apt to start in the bud of the cane, in which event only a very bad article of sugar can be made of it, and the yield is cut short at least one-half or more. Consequently sugar-planters, before windrowing their cane, always wait for the bud to be killed by a frost, which is generally looked for from the 15th of November to the 1st of December; but sometimes it is delayed until a later date, and when it comes it may be so severe that it not only kills the bud, but freezes and splits the cane, which latter totally ruins it for making sugar, thus entailing a heavy loss on the planters.

It also is well known to sugar-planters that cane having its bud first killed by the frost and windrowed in the usual way will not make as good sugar as before it was windrowed. The frost in killing the bud kills also the eyes of the cane more or less, which causes them to turn black, and these blackened eyes, together with the usual redness at the ends of the stalks where severed from the roots by the knife, caused by the action of the atmosphere, color the sugar injuriously.

With my invention, hereinbefore described, it is not necessary to wait for the frost to kill the bud and encounter the aforesaid injurious results from having the eyes killed, so as to turn black and color the sugar, or, worse than all, the cane split by the action of the frost, and thereby rendered totally useless for the purposes of making sugar.

In practicing with my invention I have, from about the 1st of November, begun to windrow the cane by cutting off the tops at points about two joints above the ripe joint, and then cutting down the remaining portion of the stalks at points near the ground. The act of cutting off the tops effectually removed the buds from the cane-stalks proper, or killed the same as effectually as the frost would have done. I then placed the stalks cut from four rows into a single furrow and covered them with the severed tops, making with such tops a thick covering, and this effectually preserved the cane from being affected by any freeze that occurred, and then when these canes were made into sugar the cut ends c c, Fig. 4, which had become reddened, were cut off, and it was found that a far better quality of sugar could be made of them than of cane windrowed in the usual way, while the danger of heavy loss from the freeze was avoided.

Previously to my invention it has been customary to grind the sugar-cane with a red end, similar to c, adhering as a portion of the stalks; but I have discovered that it is advantageous to cut off these red ends, as by so doing the coloring of the sugar is avoided.

It is not necessary to cut four rows of cane simultaneously, as two, three, five, or any other proper number, may be cut and placed in a furrow and covered by the tops in the manner herein set forth and illustrated; but I prefer to follow the mode herein set forth—that is, to cut four rows simultaneously, place the stalks in a single furrow, and cover the same with the tops of the four rows, this mode insuring the better against a severe freeze.

What I claim as my invention, and desire to secure by Letters Patent, is—

1. The mode, substantially as herein set forth, of windrowing or protecting sugar-cane from injury by frosts and weather, consisting in cutting off the tops, thereby severing the buds, cutting down the cane-stalks proper near the ground, placing the stalks in furrows, and covering them with the tops of the cane, substantially as and for the purpose described.

2. The mode herein set forth of preventing the stalks thus cut down and windrowed from coloring the juice, consisting in cutting off the reddened ends of the stalks before grinding, substantially as and for the purpose described.

WILLIAM LITTLEJOHN.

Witnesses:
B. CARLYLE FENWICK,
ROBT. L. FENWICK.